US009835842B2

(12) United States Patent
Fan

(10) Patent No.: US 9,835,842 B2
(45) Date of Patent: Dec. 5, 2017

(54) MICROSCOPE ATTACHMENT

(71) Applicant: OMNIVISION TECHNOLOGIES, INC., Santa Clara, CA (US)

(72) Inventor: Chun-Sheng Fan, Hsinchu (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 180 days.

(21) Appl. No.: 14/960,132

(22) Filed: Dec. 4, 2015

(65) Prior Publication Data
US 2017/0160534 A1    Jun. 8, 2017

(51) Int. Cl.
G02B 21/06    (2006.01)
G02B 21/36    (2006.01)
G02B 21/26    (2006.01)
G02B 21/00    (2006.01)

(52) U.S. Cl.
CPC ....... *G02B 21/362* (2013.01); *G02B 21/0008* (2013.01); *G02B 21/06* (2013.01); *G02B 21/26* (2013.01); *G02B 21/361* (2013.01)

(58) Field of Classification Search
CPC .... G02B 21/0008; G02B 21/06; G02B 21/26; G02B 21/361; G02B 21/362
USPC .......................................................... 348/79
See application file for complete search history.

(56) References Cited

U.S. PATENT DOCUMENTS

| 2008/0055718 | A1* | 3/2008 | Kono | G01N 21/6458 359/381 |
| 2010/0208054 | A1* | 8/2010 | Farr | A61B 1/00103 348/80 |
| 2011/0144505 | A1* | 6/2011 | Yamamoto | A61B 5/0064 600/476 |
| 2011/0249109 | A1* | 10/2011 | Fine | G01N 21/6408 348/79 |
| 2012/0063653 | A1* | 3/2012 | Cork | G01N 21/253 382/128 |
| 2012/0320340 | A1* | 12/2012 | Coleman, III | A61B 3/14 351/208 |
| 2013/0193544 | A1* | 8/2013 | Ozcan | B82Y 15/00 257/432 |
| 2014/0248621 | A1* | 9/2014 | Collins | G01N 15/1031 435/6.12 |
| 2015/0004717 | A1* | 1/2015 | McDevitt | G01N 35/00029 436/501 |

(Continued)

FOREIGN PATENT DOCUMENTS

CN    202886724 U    4/2013

OTHER PUBLICATIONS

Mudanyali et al, Compact and cost-effective lensless telemedicine microscopy for global health applications, 2011.*

(Continued)

*Primary Examiner* — Shan Elahi
(74) *Attorney, Agent, or Firm* — Christensen O'Connor Johnson Kindness PLLC

(57) ABSTRACT

A microscope attachment includes a lens apparatus with one or more lenses, a light source, and a sample holder. The sample holder is disposed between the lens apparatus and the light source and is positioned to transmit light from the light source through the sample holder and through the lens apparatus. The lens apparatus is disposed to enlarge an optical area in the sample holder. An attachment mechanism is disposed to connect the microscope attachment to a personal electronic device.

20 Claims, 5 Drawing Sheets

(56) References Cited

U.S. PATENT DOCUMENTS

| | | | | |
|---|---|---|---|---|
| 2015/0036043 | A1* | 2/2015 | Markovic | G02B 21/362 348/373 |
| 2015/0054935 | A1* | 2/2015 | Muramatsu | G02B 21/24 348/79 |
| 2015/0323461 | A1* | 11/2015 | Chan | G01N 21/6428 506/9 |
| 2015/0350501 | A1* | 12/2015 | Schorr, II | H04N 1/00246 348/360 |
| 2016/0004057 | A1 | 1/2016 | Lin et al. | |
| 2016/0062099 | A1* | 3/2016 | Shankar | G02B 21/24 359/384 |
| 2016/0249805 | A1* | 9/2016 | Salvati | A61B 3/14 351/206 |

OTHER PUBLICATIONS

Instructables, "$10 Smartphone to Digital Microscope Conversion," available online at: http://www.instructables.com/id/10-Smartphone-to-digital-microscope-conversion/ (Accessed Nov. 28, 2016).

Science Buddies, "Picture This: Building a Cell Phone Microscope," available online at: http://www.sciencebuddies.org/science-fair-projects/project_ideas/Photo_p024.shtml#summary (2016).

PNNL, "Want to print your own cell phone microscope for pennies? Here's How.," available online at: http://www.pnnl.gov/news/release.aspx?id=1071 (2014).

Technology Review, "A Cell-Phone Microscope for Disease Detection," available online at: http://www.technologyreview.com/news/414460/a-cell-phone-microscope-for-disease-detection/ (2009).

Amazon, "Neewer 60X Zoom LED Cell Phone Mobile Phone Microscope Micro Lens for Apple iPhone 5 5S 5C," available online at: http://www.amazon.com/Neewer-Phone-Mobile-Microscope-iPhone/dp/B00A6MTIS2 (2012).

Taiwanese Office Action dated Aug. 2, 2017, for Taiwanese Application No. 105130376, filed Sep. 20, 2016, 9 pages.

* cited by examiner

MICROSCOPE ATTACHMENT

TECHNICAL FIELD

This disclosure relates generally to microscopes, and in particular but not exclusively, relates to microscopes for use with personal electronic devices.

BACKGROUND INFORMATION

An optical microscope uses visible light to investigate structures too small to see with the naked eye. Optical microscopy is used extensively in many scientific disciplines including microelectronics, biology, pharmacology, minerology, and the like. Generally, an optical microscope includes a lens to enhance visible light transmitted or reflected through/from a sample. Simply by looking at a magnified image of the sample, much information can be gained.

In the field of medical diagnostics, the discipline of histopathology uses microscopic examination of tissue to study manifestations of disease. In clinical medicine, histopathology refers to the examination of a biopsy or surgical sample by a pathologist. Typically, slides containing the sample are examined under a microscope by a pathologist. The pathologist then produces a diagnosis in the form of a pathology report. However, due to the medical training and equipment required to produce an accurate pathology report, many medically underserved areas of the world do not have access to accurate medical diagnosis.

Similarly, in other scientific fields (such as minerology, botany, and/or zoology), it may be difficult to identify small samples in the field without the use of large microscopes and highly trained faculty.

BRIEF DESCRIPTION OF THE DRAWINGS

Non-limiting and non-exhaustive examples of the invention are described with reference to the following figures, wherein like reference numerals refer to like parts throughout the various views unless otherwise specified.

Figure 1A:
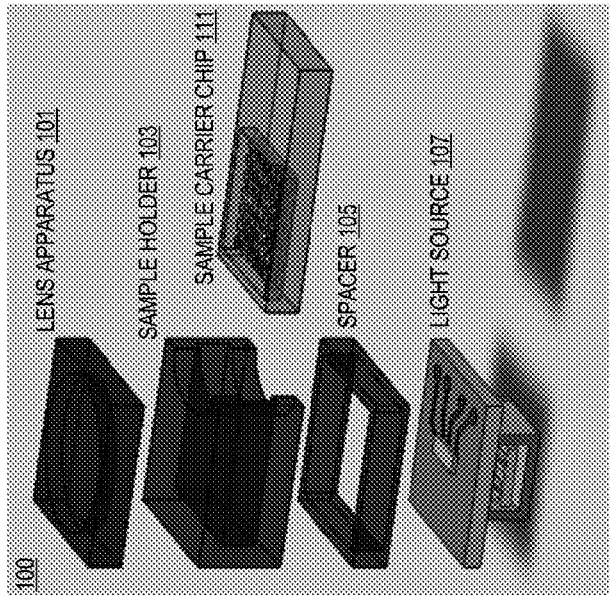
FIGS. 1A-1C illustrate an example microscope attachment, in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of an apparatus and method of using a microscope attachment are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise.

Figure 1C:
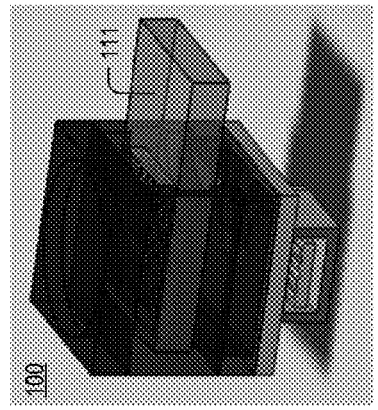
Figure 1B:
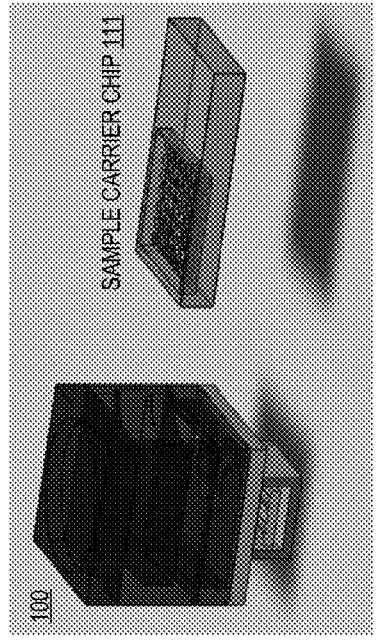

FIGS. 1A-1C illustrate example microscope attachment 100. FIG. 1A shows an exploded isometric view of example microscope attachment 100 including: lens apparatus 101, sample holder 103, spacer 105, and light source 107. The example in FIG. 1A also shows a transparent sample carrier chip 111 with a sample loaded in a recessed sample region. In the depicted example, lens apparatus 101 includes one or more lenses which may be configured to provide variable states of magnification and/or focus. Sample holder 103 is disposed between lens apparatus 101 and light source 107, and sample holder 103 is disposed to transmit light from light source 107 through sample holder 103 and through lens apparatus 101. Lens apparatus 101 is disposed to enlarge an optical area in sample holder 103, which may correspond to the area in sample holder 103 configured to receive sample carrier chip 111. In the depicted example, light source 107, includes one or more light emitting diodes coupled to electrical interconnects to receive instruction and power from an external device. In one example, the electrical interconnects include a USB port or micro USB port which connect to a power/data cable. Further, microscope attachment 100 may have other features not depicted such as: mechanical actuators to move lenses contained in lens apparatus 101, light filters/polarizers, light diffuser layers, additional light sources, memory which may contain instructions for a personal electronic device, or the like.

FIG. 1B illustrates an isometric view of assembled microscope attachment 100. In the depicted example, all of the components of microscope attachment 100 snap together (ether pressure fit or otherwise) to form microscope attachment 100. Further, the housing components of microscope attachment 100 may be made out of relatively inexpensive materials such as plastic. However, in one or more examples, the components of microscope attachment 100 may include more expensive materials such as metal or glass. In the depicted example, the components of microscope attachment 100 fit together to form a small cube, however, in other examples not depicted, the components may fit together to form a cylinder or the like.

FIG. 1C depicts loading sample carrier chip 111 into microscope attachment 100. In the depicted example, a sample has been placed into a recessed portion of sample carrier chip 111, and sample carrier chip 111 was loaded into sample holder 103 to be imaged. As illustrated, sample carrier chip 111 may be transparent to permit light to travel from light source 107, through sample carrier chip 111, and into lens apparatus 101. However, in another example where light source 107 is disposed between sample holder 103 and lens apparatus 101, sample carrier chip 111 may not be transparent and may have a reflective backing. Sample carrier chip 111 may also have calibration markings such as a scale bar, color spectrum, or the like. However, in a different example, sample carrier chip 111 may be a commercially available glass microscope slide.

Figure 2B:
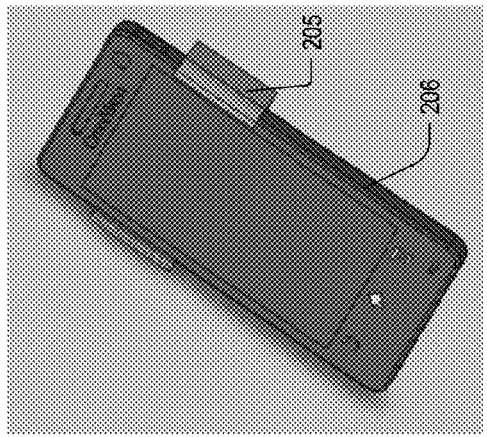
FIGS. 2A-2C illustrate the example microscope attachment of FIGS. 1A-1C coupled to a portable electronic device, in accordance with the teachings of the present invention.
Figure 2A:
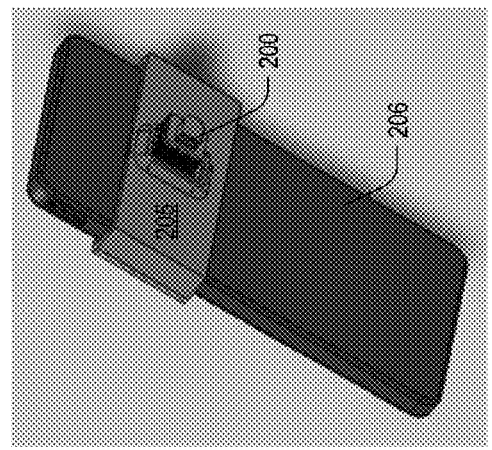
Figure 2C:
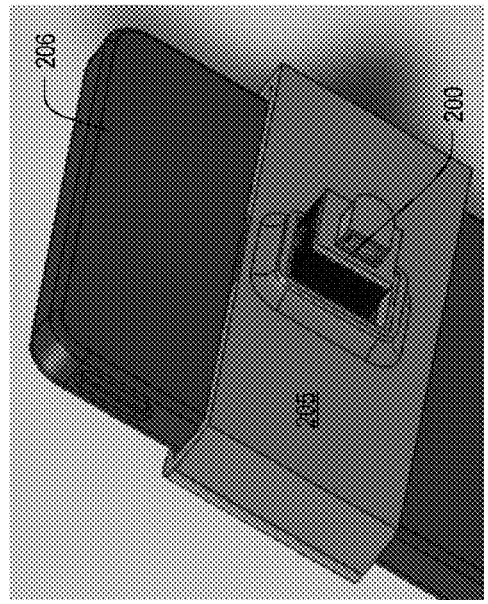

FIGS. 2A-2C illustrate several isometric views of example microscope attachment 200 (e.g., microscope attachment 100) attached to personal electronic device 206. Attachment mechanism 205 is disposed to connect microscope attachment 200 to personal electronic device 206. In the depicted example, attachment mechanism 205 mechanically attaches to personal electronic device 206 by wrapping around the edges of personal electronic device 206, and microscope attachment 200 snaps into attachment mechanism 205. However, in alternate examples, attachment mechanism 205 may attach to personal electronic device 206 in other ways such as: incorporation into a case for personal electronic device 206, utilizing a non-permanent adhesive (e.g., Van der Waals forces), suction cups, magnetic attachment methods, or the like. It is worth noting that various attachment mechanisms 205 may be used with microscope attachment 200 in order to make microscope attachment 200 compatible with a wide array of personal electronic devices. Although in the depicted example, personal electronic device 206 is a smart-phone, in other examples personal electronic device 206 may include smart-watches, smart-glasses, tablets, or the like. Furthermore, microscope attachment 200 may be glued into attachment mechanism 205, press fit into attachment mechanism 205, or the like. As shown, attachment mechanism 205 is coupled to the microscope attachment 200 to optically align the lens apparatus (e.g., lens apparatus 101) and the image sensor 343 (i.e., cell phone camera) coupled to personal electronic device 206.

Figure 3:
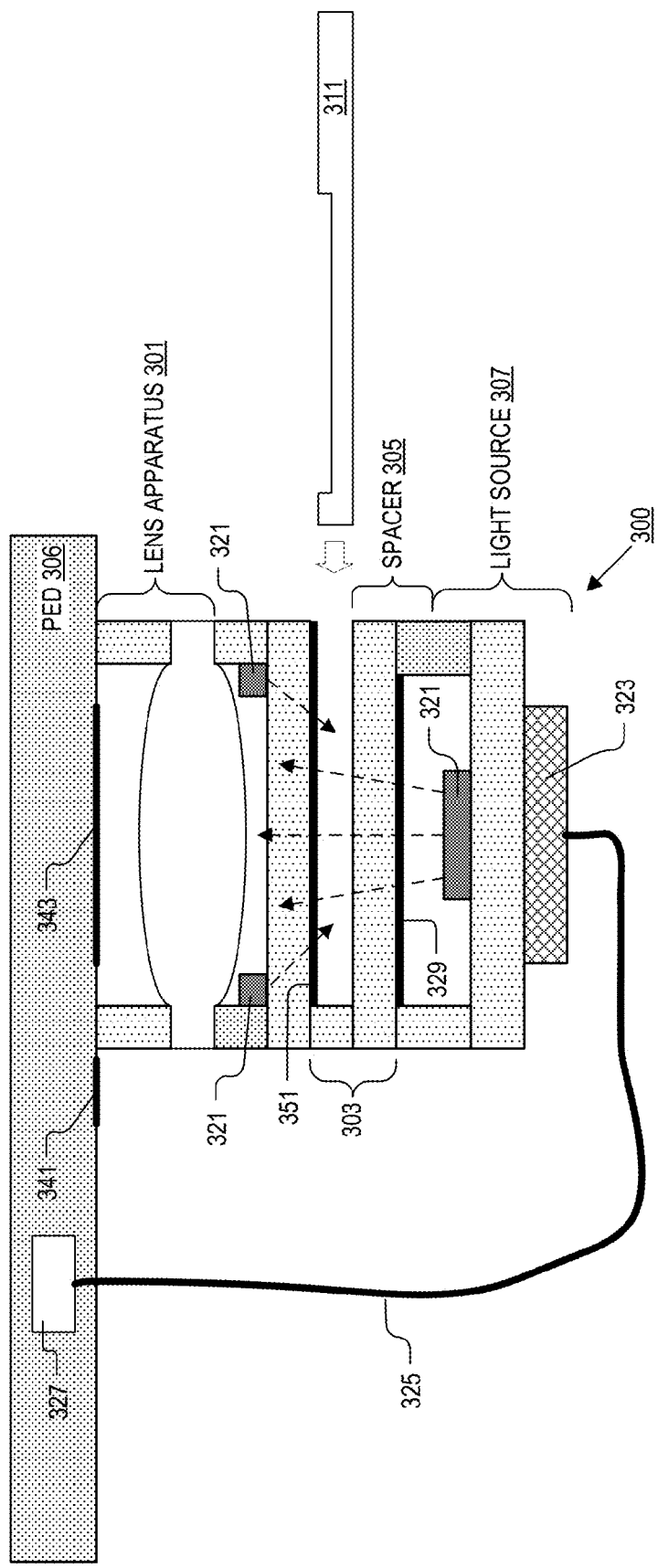
FIG. 3 is a cross sectional illustration of one example of a microscope attachment, in accordance with the teachings of the present invention.

FIG. 3 is a cross sectional illustration of one example of microscope attachment 300. In the depicted example, microscope attachment 300 includes: lens apparatus 301 (including one or more lenses), sample holder 303, spacer 305 and, light source 307. Specifically, microscope attachment 300 is used with a cellular phone (personal electronic device 306). Lens apparatus 301 is configured to be removably attached to a surface of the cellular phone and optically align lens apparatus 301 with image sensor 343, where image sensor 343 is included in the cellular phone (e.g., a cell phone camera). Sample holder 303 is disposed to receive light from light source 307, and sample holder 303 is optically aligned with lens apparatus 301 such that sample light travels from a sample, through lens apparatus 301 and into image sensor 343.

As shown in the example depicted in FIG. 3, light source 307 may include power cable 325 with a first side and a second side. The first side of power cable 325 is coupled to one or more light emitting diodes 321, and second side of power cable 325 is configured to couple to a power and data output 327 of personal electronic device 306 (e.g., a USB port). In the depicted illustration, the first side of power cable 325 is attached to a power input 323 to provide power to one or more light emitting diodes 321. In one example, power input 323 may also include logic circuitry and software. Power input 323 (and/or other circuitry in microscope attachment 300) may be configured to provide input to personal electronic device 306 so that personal electronic device 306 can control microscope attachment 300 and/or provide diagnostic information.

As illustrated, microscope attachment 300 may include spacer 305 disposed between light source 307 and sample holder 303, where spacer 305 includes a diffuser layer 329 coupled to diffuse light output from one or more light emitting diodes 321. In one example, diffuser layer 329 may also include a one way mirror such that diffuser layer 329 reflects light incident on diffuser layer 329 from the direction of sample holder 303, and transmits diffuse light from the direction of light source 307. Alternatively, diffuser layer 329 and the mirror maybe two separate structures. In the depicted example, light filter 351 is disposed between sample holder 303 and lens apparatus 301. In one example, light filter 351 passes visible light and excludes UV light. In another or the same example, light filter 351 may include a polarizer. It should be noted that, the location of diffuser layer 329, mirror, polarizers, or filters is interchangeable depending on the configuration of light source 307 and the desired image characteristics. Further, these components may be removable depending on use case of microscope attachment 300.

In the depicted example, microscope attachment 300 has a primary light source (e.g., light emitting diodes 321 positioned in light source 307) disposed such that sample holder 303 is located between the primary light source and lens apparatus 301. This allows for transmission imaging of samples in sample holder 303. Additionally, microscope attachment 300 includes a secondary light source (i.e., one or more light emitting diodes 321 disposed between sample holder 303 and image sensor 343). It should be noted that sample holder 303 may be disposed between reflective layer 329 and light emitting diodes 321, and reflective layer 329 reflects light emitted from the secondary light source. This configuration allows for microscope attachment 300 to image samples in a reflection imaging mode. Although the example microscope attachment 300 depicted in FIG. 3 includes both a primary and secondary light source, other embodiments may include one or the other. Additionally, the location of light source 307 may change depending on the desired imaging mode. In both primary and secondary light sources, one or more light emitting diodes 321 are electrically coupled to the personal electronic device 306 (e.g., a cellular phone) to receive power and operating data from the personal electronic device 306.

In one example, light source 307 may include light emitting diodes that emit visible light, photodiodes that emit UV light, photodiodes that emit infrared light, and/or laser diodes to produce coherent electromagnetic radiation. The aforementioned diodes may exist together in an array or maybe individually disposed in light source 307. Further, diodes may be used separately or in conjunction with other lighting sources such as ambient light or light supplied by a light source on personal electronic device 306.

Figure 4:
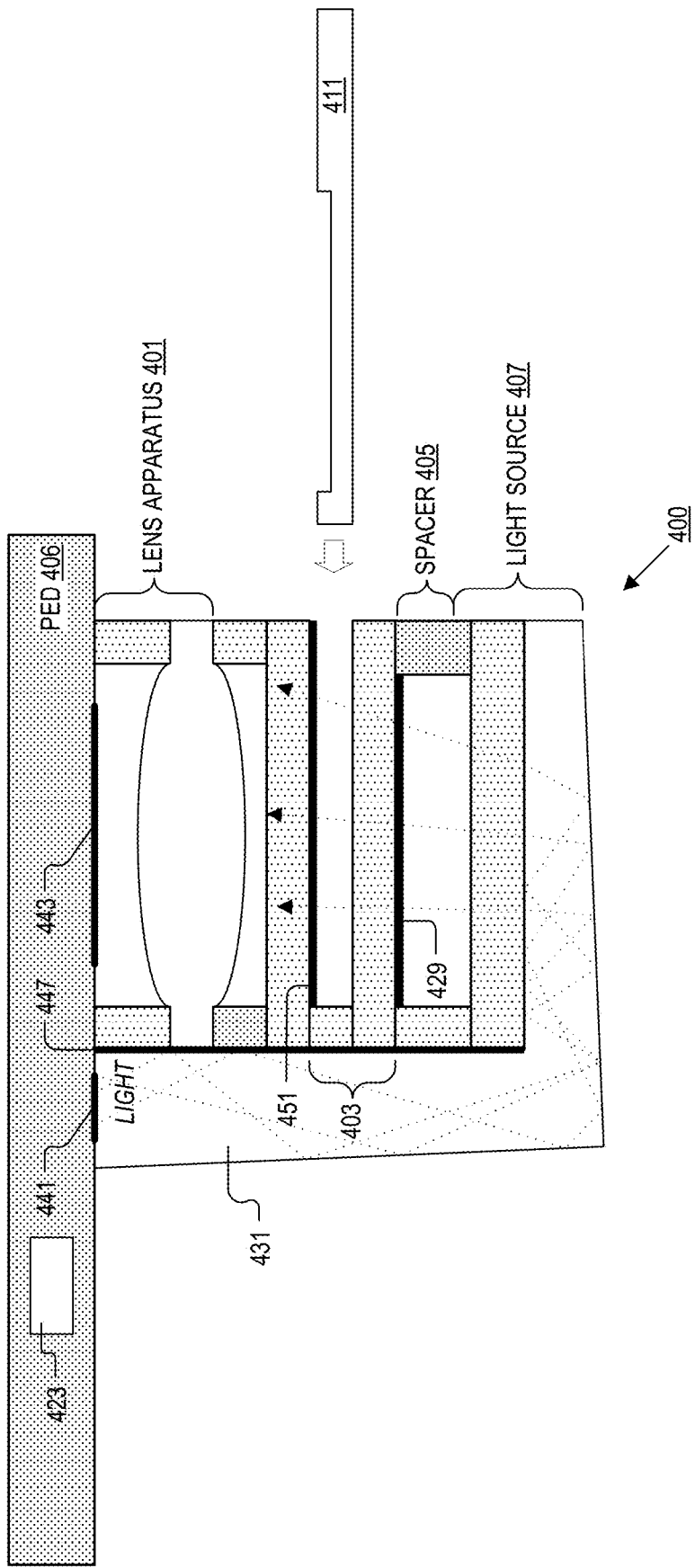
FIG. 4 is a cross sectional illustration of one example of a microscope attachment, in accordance with the teachings of the present invention.

FIG. 4 is a cross sectional illustration of one example of a microscope attachment 400. Microscope attachment 400 shares many features with microscope attachment 300. However, one noteworthy distinction between microscope attachment 400 and microscope attachment 300, is light source 403 includes optical transmitter 431. In the depicted example, optical transmitter 431 exhibits total-internal reflection, and is coupled to receive light from an external light source. As shown, light is free to exit optical transmitter 431 in light source region 407 of microscope attachment 400 and the lateral bounds of light source 407 are coextensive with the lateral bounds of microscope attachment 400. In one example, the external light source is a cellphone camera light 441; however, in another example the external light source may be a lightbulb or the like. As illustrated in FIG. 4, a reflective coating 447 may be disposed between the back of microscope attachment 400 and optical transmitter 431. In one example, optical transmitter 431 may be a plastic such as acrylic or the like, however, in an alternate example, optical transmitter 431 may be glass or other oxide material.

Although the device in FIG. 4 has a single lens element in lens apparatus 401, lens apparatus 401 may be configured to have variable optical magnification. This may include the lens in lens apparatus 401 being able to move closer to, and further away from, personal electronic device 406. Although not depicted, motion of lenses may be facilitated by mechanical actuators disposed in lens apparatus 401. Lens apparatus 401 may be able to work in conjunction with personal electronic device 406 internal camera optics to produce enhanced magnification. Further, lens apparatus 401 may include more than one lens, and each lens may be free to move independently from the other lenses. In one example, lens motion is controlled by software installed on personal electronic device 406. In another example, lens motion maybe governed by hardware/software included in microscope attachment 400 and powered by a personal electronic device 406 or an internal power source such as a battery pack. Alternatively, lens location may be controlled manually by the user (e.g., like a telescope or binoculars).

Figure 5:
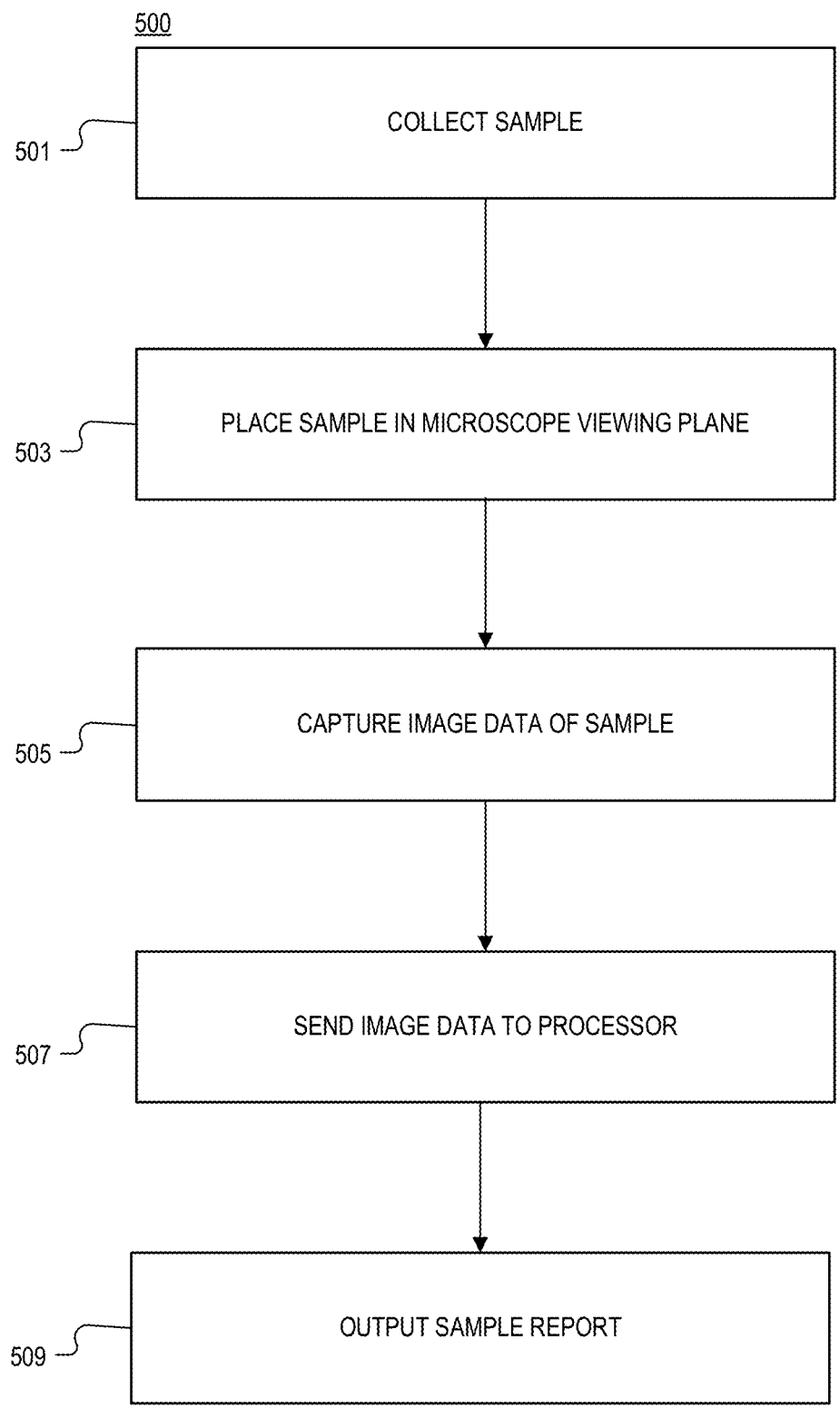
FIG. 5 is a flow chart illustrating an example method of sample analysis using the microscope attachment depicted in FIGS. 1A-1C.

FIG. 5 is a flow chart illustrating an example method 500 of sample analysis using the microscope attachment depicted in FIGS. 1A-1C. The order in which some or all of the process blocks appear in method 500 should not be deemed limiting. Rather, one of ordinary skill in the art having the benefit of the present disclosure will understand that some of method 500 may be executed in a variety of orders not illustrated, or even in parallel. Further, the method 500 of sample analysis should not be limited to medical procedures, but is also applicable to industrial applications, minerology, chemistry, botany, and the like.

Process block 501 depicts collecting a sample. As previously stated, this may include collecting a biological sample, mineral sample, industrial sample, or the like. Although not expressly stated in process block 501, the sample may need to be prepped for examination which may involve thinly slicing the sample or dying the sample (as is commonly required biological applications).

Process block 503 shows placing the sample in a viewing plane of a microscope (e.g., microscope attachment 200), where the microscope is coupled to an image sensor included in a personal electronic device (e.g., personal electronic device 206). In this example, the image sensor is optically aligned with the viewing plane of the microscope. In one example, the viewing plane of the microscope is located in a sample holder (e.g., sample holder 103) and is proximate to the surface of a sample carrier chip (e.g., sample carrier chip 111). In one example, the location of the viewing plane is dynamic and based on the location of the lenses in the lens apparatus (e.g., lens apparatus 101) and the focus of the image sensor in the personal electronic device. In another or the same example, placing the sample in the viewing plane of the microscope includes placing the sample in a sample carrier and inserting the sample carrier into a sample holder included in the microscope.

Process block 505 illustrates capturing image data of the sample using the image sensor. In one embodiment this may include capturing an optical image of the sample. The image sensor may use all photodiodes at once to capture an image, or may employ a single row of pixels at a time to capture the image. In one example, the way in which the image sensor captures the image of the sample is determined by software (specific to the microscope attachment) installed on the personal electronic device. The software may synchronize flash/lighting effects and optimize the mode of image capture to yield higher quality data about the sample.

In a different example, the image sensor may capture an image of the sample using wavelengths of light outside the visible spectrum. For instance, the microscope may capture an absorption spectrum of the sample by varying the wavelength of light emitted by the light source (e.g., light source 107), and record the intensity of the light received with the image sensor. Additionally, the image sensor may capture an image of the sample using linearly or circularly polarized light. Further, the image sensor may capture electromagnetic (EM) emission from the sample. For example, the light source may emit UV light, the sample may absorb the UV light and emit lower frequencies of EM radiation. Accordingly, the image sensor may capture an image of the lower frequency of EM radiation. In one example, the image sensor and microscope use inelastic scattering (such as Raman scattering) of monochromatic light to identify chemical structures. In this example, the light source includes laser light and the image sensor filters out light at the wavelength corresponding the laser light. In other examples, other spectroscopic methods or rough approximations of spectroscopic methods may be used to capture a sample image.

It should be noted that prior to capturing image data, the image sensor and the microscope apparatus may undergo calibration. This may include inserting a known sample or a factory made calibration sample into the microscope attachment, capturing an image of the calibration sample, and adjusting the image sensor and microscope attachment accordingly. Alternatively, a calibration image may be present on the sample carrier chip (e.g., sample carrier chip 111) so that calibration is performed in conjunction with imaging the sample. In one example, sample carrier chip 111 includes a scale bar so sample dimensions may be determined after image data is captured.

The microscope attachment may contain one or more sources of light which may be powered by the personal electronic device. The light sources may be electrically coupled to the personal electronic device such that the user can chose between the different lighting sources, intensities, and exposure modes depending on the sample being imaged and the desired image data.

Process block 507 depicts sending the image data to a processor. The processor is coupled to the personal electronic device, and the processor analyzes the image data. The processor may run programs from the memory of the personal electronic device to analyze the image data. In one example, these programs take the form of applications that may be downloaded from the internet or other source. In another example, the processor may be coupled to the microscope itself and the microscope may contain instructions for analyzing image data. In one or more examples, the processor may remove specific wavelengths of light from the image, enhance certain aspects of the image, analyze image composition, identify chemicals present in the sample, or otherwise.

Process block 509 shows outputting the sample report. The sample report may simply include a magnified image of the sample, or may include other more complex data analysis. In one example, software is installed on the personal electronic device to generate the sample report. In another or the same example, the sample report is output to a screen coupled to the personal electronic device, and the sample report includes information regarding the chemical composition of the sample. In another example, the sample report may simply be a binary determination of a state of the sample (e.g., a pregnancy test). In another example, the sample report may elicit structural information about the sample or absorption/reflection spectra of the sample.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A microscope attachment, comprising:
a lens apparatus including one or more lenses;
a light source;
a sample holder disposed between the lens apparatus and the light source, wherein the sample holder is disposed to transmit light from the light source through the sample holder and through the lens apparatus, and wherein the lens apparatus is disposed to enlarge an optical area in the sample holder; and
an attachment mechanism shaped to connect the microscope attachment to a personal electronic device, wherein the attachment mechanism is positioned to optically align the lens apparatus with an image sensor disposed in the personal electronic device when the microscope attachment is connected to the personal electronic device.

2. The microscope attachment of claim 1, wherein the light source includes:
one or more light emitting diodes; and
a power cable with a first side and a second side, wherein the first side of the power cable is coupled to the one or more light emitting diodes, and the second side of the power cable is configured to couple to a power and data output of the personal electronic device.

3. The microscope attachment of claim 2, further comprising a spacer disposed between the light source and the sample holder, wherein the spacer includes a diffuser layer disposed to diffuse light output from the one or more light emitting diodes.

4. The microscope attachment of claim 1, wherein the light source includes an optical transmitter, wherein the optical transmitter exhibits total-internal reflection, and wherein the optical transmitter is optically coupled to receive light from an external light source.

5. The microscope attachment of claim 4, wherein the external light source is disposed in the personal electronic device.

6. The microscope attachment of claim 1, further comprising a light filter disposed between the sample holder and the lens apparatus.

7. The microscope attachment of claim 6, wherein the light filter passes visible light and excludes UV light.

8. The microscope attachment of claim 6, wherein the light filter includes a polarizer.

9. A microscope attachment for use with a cellular phone, comprising:
a lens apparatus and a light source, wherein the lens apparatus is configured to removably connect to a surface of the cellular phone and optically align the lens apparatus with an image sensor, and wherein the image sensor is included in the cellular phone; and
a sample holder disposed to receive light from the light source, wherein the sample holder is optically aligned with the lens apparatus, and wherein the sample holder is configured to allow sample light to travel from a sample, through the lens apparatus and into the image sensor.

10. The microscope attachment of claim 9, wherein sample holder is disposed between the light source and the lens apparatus.

11. The microscope attachment of claim 9, wherein the light source and lens apparatus are disposed between the sample holder and the image sensor.

12. The microscope attachment of claim 11, further comprising a reflective layer, wherein the sample holder is disposed between the reflective layer and the light source, and wherein the reflective layer reflects light emitted from the light source.

13. The microscope attachment of claim 9, wherein the light source includes one or more light emitting diodes.

14. The microscope attachment of claim 13, wherein the one or more light emitting diodes are electrically coupled to the cellular phone to receive power and operating data from the cellular phone.

15. The microscope attachment of claim 9, wherein the lens apparatus is configured to have variable optical magnification.

16. A method of sample analysis comprising:
collecting a sample;
placing the sample in a viewing plane of a microscope, wherein the microscope is coupled to an image sensor included in a personal electronic device, and wherein the image sensor is optically aligned with the viewing plane of the microscope, and wherein placing the sample in the viewing plane of the microscope includes placing the sample in a sample carrier and inserting the sample carrier into a sample holder included in the microscope;
capturing image data of the sample using the image sensor;
sending the image data to a processor, wherein the processor is coupled to the personal electronic device, and wherein the processor analyzes the image data and generates a sample report; and
outputting the sample report.

17. The method of claim 16, wherein outputting the sample report includes sending the sample report to a screen of the personal electronic device.

18. The method of claim 16, wherein the personal electronic device includes software installed on the personal electronic device to generate the sample report.

19. The microscope attachment of claim 1, wherein a backside of the personal electronic device has a first area, and wherein a portion of the microscope apparatus containing the lens apparatus, the light source, and the sample holder, has a smaller area than the first area.

20. The microscope attachment of claim 5, wherein the optical transmitter is substantially "L" shaped.

* * * * *